United States Patent
Park

(10) Patent No.: US 7,385,322 B2
(45) Date of Patent: Jun. 10, 2008

(54) ROTOR FOR USE IN AN OUTER ROTOR TYPE MOTOR OF A DRUM TYPE WASHING MACHINE

(75) Inventor: Jin Hyeong Park, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 86 days.

(21) Appl. No.: 11/289,274

(22) Filed: Nov. 30, 2005

(65) Prior Publication Data

US 2006/0119214 A1 Jun. 8, 2006

(30) Foreign Application Priority Data

Dec. 3, 2004 (KR) .................. 10-2004-0100943

(51) Int. Cl.
*H02K 9/06* (2006.01)
*H02K 9/04* (2006.01)
*H02K 1/32* (2006.01)

(52) U.S. Cl. .................. 310/61; 310/62; 310/63

(58) Field of Classification Search .......... 310/61, 310/62, 63, 67 R, 58, 59
See application file for complete search history.

(56) References Cited

U.S. PATENT DOCUMENTS

| | | | | |
|---|---|---|---|---|
| 5,019,737 A | * | 5/1991 | Bruno | 310/89 |
| 5,586,455 A | * | 12/1996 | Imai et al. | 68/12.02 |
| 5,734,214 A | * | 3/1998 | Gilliland et al. | 310/89 |
| 6,302,669 B1 | * | 10/2001 | Nishizawa et al. | 425/3 |
| 6,509,660 B1 | * | 1/2003 | Asao | 310/63 |
| 7,168,923 B2 | * | 1/2007 | Vasilescu et al. | 416/175 |
| 2006/0119214 A1 | * | 6/2006 | Park | 310/265 |

FOREIGN PATENT DOCUMENTS

| | | | |
|---|---|---|---|
| EP | 0 345 080 A2 | * | 12/1989 |
| EP | 0345080 | | 12/1989 |
| EP | 1018795 | | 7/2000 |
| EP | 1018795 A1 | * | 7/2000 |
| GB | 2004980 A | * | 4/1979 |
| JP | 2002/078293 | | 3/2002 |
| JP | 2004274907 A | * | 9/2004 |

* cited by examiner

*Primary Examiner*—Darren Schuberg
*Assistant Examiner*—Hong-Vinh Nguyen
(74) *Attorney, Agent, or Firm*—Bacon & Thomas, PLLC

(57) ABSTRACT

A rotor of an outer rotor type motor is coupled to an outside of a stator, and is provided with a shaft coupler, for being connected with a shaft of a drum, fixed at its center portion by an injected material, and a plurality of radiation holes formed therein continuously in a radial direction. The rotor includes at least one cooling fin provided with a base member fixed to a bottom surface of the rotor and a curved member attached to the base member, wherein the cooling fin is combined with the bottom surface so as to be disposed adjacent to the radiation hole. Therefore, a contact area with air can be increased, and an air circulation through the radiation holes can be facilitated. Accordingly, deterioration of the efficiency of a washing machine is prevented despite long periods of operation, and any damage caused by overheating is prevented.

6 Claims, 6 Drawing Sheets

ROTOR FOR USE IN AN OUTER ROTOR TYPE MOTOR OF A DRUM TYPE WASHING MACHINE

FIELD OF THE INVENTION

The present invention relates to a drum type washing machine; and more particularly, to a rotor for use in an outer type motor of a drum type washing machine, which is capable of increasing a contact area thereof with air, facilitating air circulation through a radiation hole and thus improving cooling effect by attaching cooling fins with a curved member shaped into a circular arc near the radiation holes formed continuously in a radial direction.

BACKGROUND OF THE INVENTION

In general, a drum type washing machine performs a washing on laundry articles by using a gravitational potential energy produced when it rotates a cylindrical drum repeatedly in a water tub to lift them to an upper portion of the drum and then allow them to drop.

Such the drum type washing machine is advantageous in that damages caused to the laundry articles by their entangling and an amount of washing water can be reduced when compared with pulsator type and agitator type washing machines.

Such the drum type washing machine, as shown in FIG. 1, includes a drum 120, for providing a washing space, rotatably installed in a water tub 110 horizontally installed on an upper portion of a base 130, and a detergent supply container 140, for supplying a washing detergent including a washing assisting agent, such as a fabric softening agent, installed above the water tub 110. Further, between an upper portion of a housing (not shown) and the water tub 10, a plurality of tensile coil springs (not shown) are installed to absorb vibrations and impacts produced by a rotation and stop of the drum 120 or falling of the laundry articles during the washing and dewatering process.

Further, between a lower portion of the housing and the water tub 110, oil dampers 160 are installed. So the vibration and the impacts can be reduced more effectively by the damping action of the dampers 160 along with the elastic force of the coil springs.

The drum type washing machine 200 with the configuration described above usually has a drying function and allows a drying process to be performed after completing the washing and dewatering process. Therefore, the drum type washing machine 200 further includes a drying device in an upper and rear portion thereof, which is provided with a chamber 170 having a heater therein, a blower 175 and a condensation duct 180. The drying device circulates a drying air repeatedly into the inside of the drum 120 and condenses moisture contained in the drying air, thus drying the laundry articles.

Meanwhile, on a rear surface of the water tub 110 of the drum type washing machine 200, a motor for rotating the drum 120 is provided. Such the driving motor is usually constructed by an electric induction motor in which a rotational force is generated by an interaction between a rotating magnetic field generated in a stator and an inductive magnetic field generated in the rotor. The electric induction motor can be designed in various ways, i.e., it can be designed as a three-phase induction motor, a three-phase winding type induction motor and so forth as well as a single-phase induction motor. And it has a capability to maintain a constant rotational speed and a long lifetime.

The electric induction motor used as the driving motor of the drum type washing machine 200 basically includes a stator generating an induced magnetism by receiving a power from outside via a winding coil wound around a core; and a rotator rotating a rotation shaft of the drum 120 combined therewith through a shaft coupler by the induced magnetism generated by the stator.

In the electric induction motor with the above-described configuration, an electric current is induced to a secondary winding by an electromagnetic induction of a primary winding which is connected to a power supply, and a rotary power is obtained by an interaction between the current induced at the secondary winding and a rotating magnetic field. Such an electric induction motor can be classified into an inner rotor type or an outer rotor type depending on relative locations of the stator and the rotor.

In the inner rotor type motor, since the rotor rotates in the stator, a diameter of the rotor is restricted. Therefore, it has a disadvantage that a torque per unit volume is low. And an inner space thereof cannot be used.

Recently, an outer rotor type induction motor having a rotor installed outside a stator has wide applications, because it is capable of increasing a torque at a same volume, and, by using the outer rotor type motor, it is possible to use the inner space of the stator for another purpose.

The rotor of the outer rotor type induction motor is, as shown in FIG. 2, manufactured to be shaped into a hollow cylinder according to a drawing method by a press.

The rotor 10 is provided with a plurality of radiation holes 1 formed in a bottom portion thereof continuously in a radial direction. The radiation holes 1 are for discharging heat produced during the operation of the motor to the outside by circulating air through the radiation holes.

However, since a contact area of the rotor 10 with air is not sufficient, the heat produced during the operation of the motor cannot be dissipated effectively only with the radiation holes 1. Therefore, the efficiency of the motor declines sharply.

To overcome such a problem, recently the rotation holes 1 are formed by cutting a portion of the bottom of the rotor corresponding to the rotation hole 1 along its boundary except for one side, and then by bending the cut portion about the non-cut side outwards to form a cooling fin 2.

The cooling fin 2 can increase the contact area of the rotor 10 with air, thus improving the cooling effect. However, a width of the radiation hole 1 should be less than a predetermined value to prevent safety accidents such as insertion of fingers therein.

In particular, due to characteristics of the manufacture method, the shape of the cooling fin 2 is limited to a rectangle. Therefore, there are several drawbacks; heat exchange by the contact with air cannot be maximized, and outside air cannot be introduced into the inside of the rotor 10 through the radiation holes 1 during forward and backward rotation of the rotor 10, thus deteriorating the cooling effect.

Accordingly, when the drum type washing machine employing the conventional rotor 10 described above is operated for a long period of time, its efficiency will decline sharply. As a result, the washing cannot be performed appropriately.

SUMMARY OF THE INVENTION

It is, therefore, an object of the present invention to provide a rotor for use in an outer rotor type motor of a drum type washing machine, which is capable of increasing a contact area thereof with air, facilitating air circulation through a radiation hole and thus improving cooling effect by attaching cooling fins with a curved member shaped into a circular arc near the radiation holes formed continuously in a radial direction.

In accordance with the present invention, there is provided a rotor for use in an outer rotor type motor of a drum type washing machine, which is coupled to an outside of a stator, and which is provided with a shaft coupler, for being connected with a shaft of a drum, fixed at its center portion by an injected material, and a plurality of radiation holes formed therein continuously in a radial direction, the rotor including: at least one cooling fin provided with a base member fixed to a bottom surface of the rotor and a curved member attached to the base member, wherein the cooling fin is combined with the bottom surface so as to be disposed adjacent to the radiation hole.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
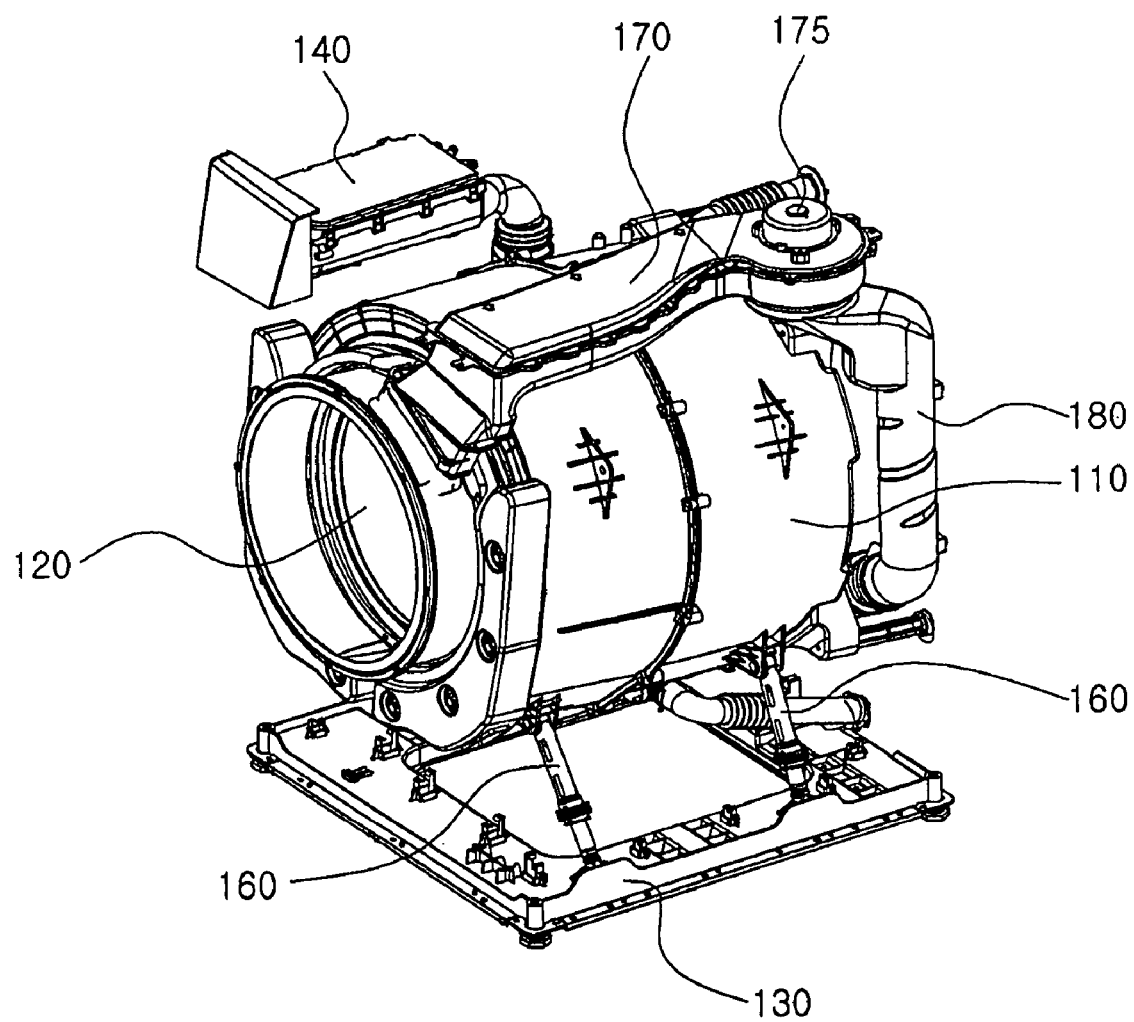
FIG. 1 is an essential part perspective view of a conventional drum type washing machine.
Figure 2:
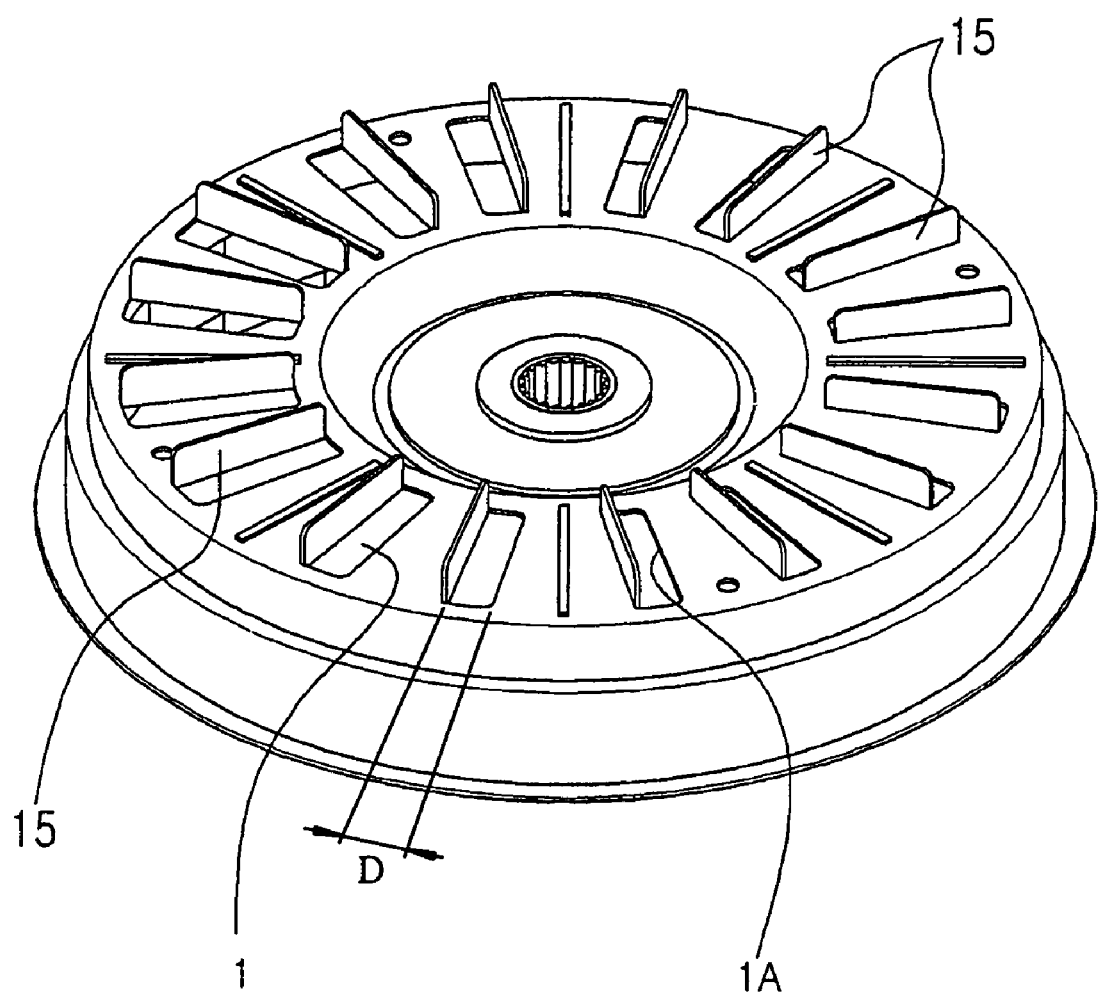
FIG. 2 presents a perspective view of a rotor constituting an outer rotor type motor of the conventional drum type washing machine.

Preferred embodiments of the present invention will now be described in detail with reference to the accompanying drawings, wherein like parts appearing FIGS. 1 to 4 are represented by like reference numerals.

Figure 3:
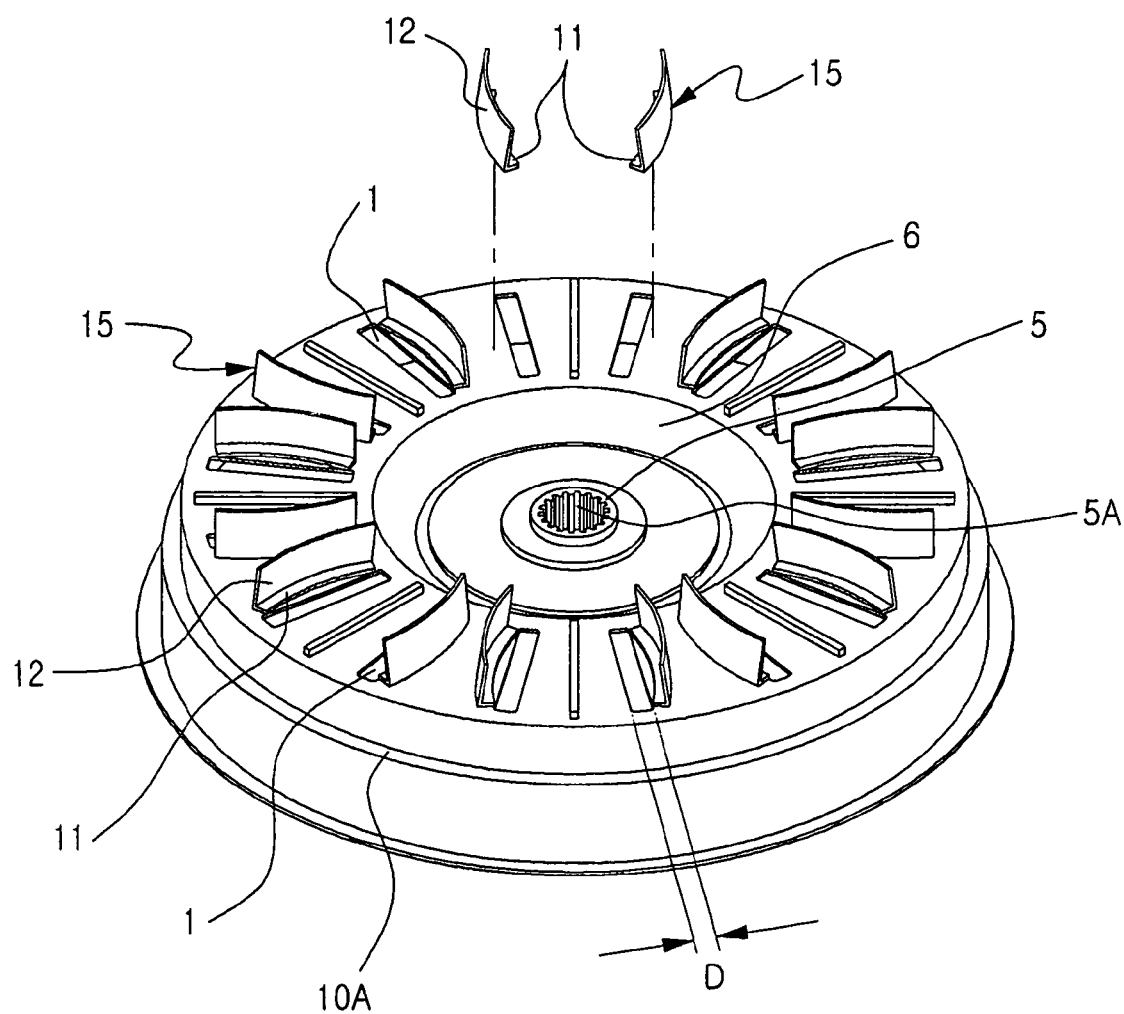
FIG. 3 depicts a perspective view of a rotor in accordance with an embodiment of the present invention.
Figure 4:
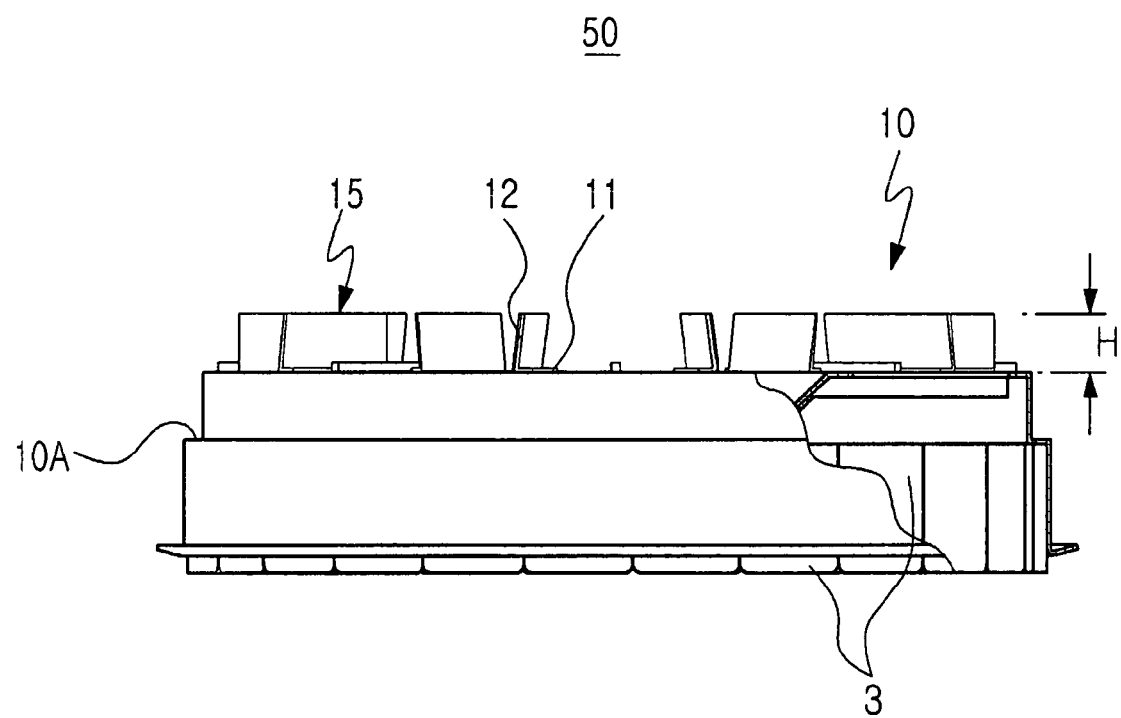
FIG. 4 offers a side view of the rotor shown in FIG. 3 with a cutaway portion.

FIG. 3 is a perspective view of a rotor in accordance with an embodiment of the present invention, and FIG. 4 is a side view of the rotor shown in FIG. 3 with a cutaway portion revealing the cross section. The rotor 10 for use in an outer rotor type motor of a drum type washing machine in accordance with the present invention is coupled to an outside of a stator, and rotates according to an operation of the outer rotor type motor to drive a shaft of a drum connected to its center portion.

The present invention as such is one which is processed into a cylindrical shape with a side coupling with the stator opened according to a drawing method by a press as in a rotor manufacture process of a rotor with a conventional structure. In it inner circumferential surface, a yoke portion 10A having a height difference is formed, and a plurality of permanent magnets 3 are continuously arranged at a regular interval via the yoke portion 10A.

Additionally, in the central portion, a shaft coupler 5, forming a serration groove 5A into which the shaft sticking out from the drum is inserted, is fixed by an injected material 6 attached by an insert molding.

Further, the rotor 10 for use in an outer rotor type motor of a drum type washing machine in accordance with the present invention is provided with a plurality of radiation holes 1 formed continuously in a radial direction to circulate air by discharging interior air to the outside and introducing external air into the inside, and a plurality of cooling fins adjacent to the radiation holes 1.

The cooling fins 15 increase a contact area of the rotor 10 with air to facilitate heat emission and, as well, introduce forcedly outside air into the inside through the radiation holes 1. The cooling fins 15 are made of a metal plate with a high heat conductivity, and fixedly connected to a bottom surface of the rotor 10 by means of the welding process or fastening bolts.

The cooling fin 15 is provided with a base member 11 formed at its lower portion to provide a fixing surface and a curved member 12 formed at a curved side of the base member 11 to function as an impeller.

Further, the curved member 12 is bent downwards so as to form an angle ranging from about 44 to 80° with the base member 11. Therefore, when the rotator 10 is rotating, the cooling fin 15 can introduce the outside air into the inside rapidly through the radiation hole 1 thanks to the function of the curved member 12.

Additionally, the curved member 12 is configured to have a vertical height H in a vertical direction greater than a gap D of the radiation hole 1. Furthermore, a cross section of the curved member 12 taken along a horizontal plane parallel to the base member 11 has a shape of a circular arc, which also helps the cooling fin 15 introduce the outside air to the inside through the radiation hole 1.

Figure 5:
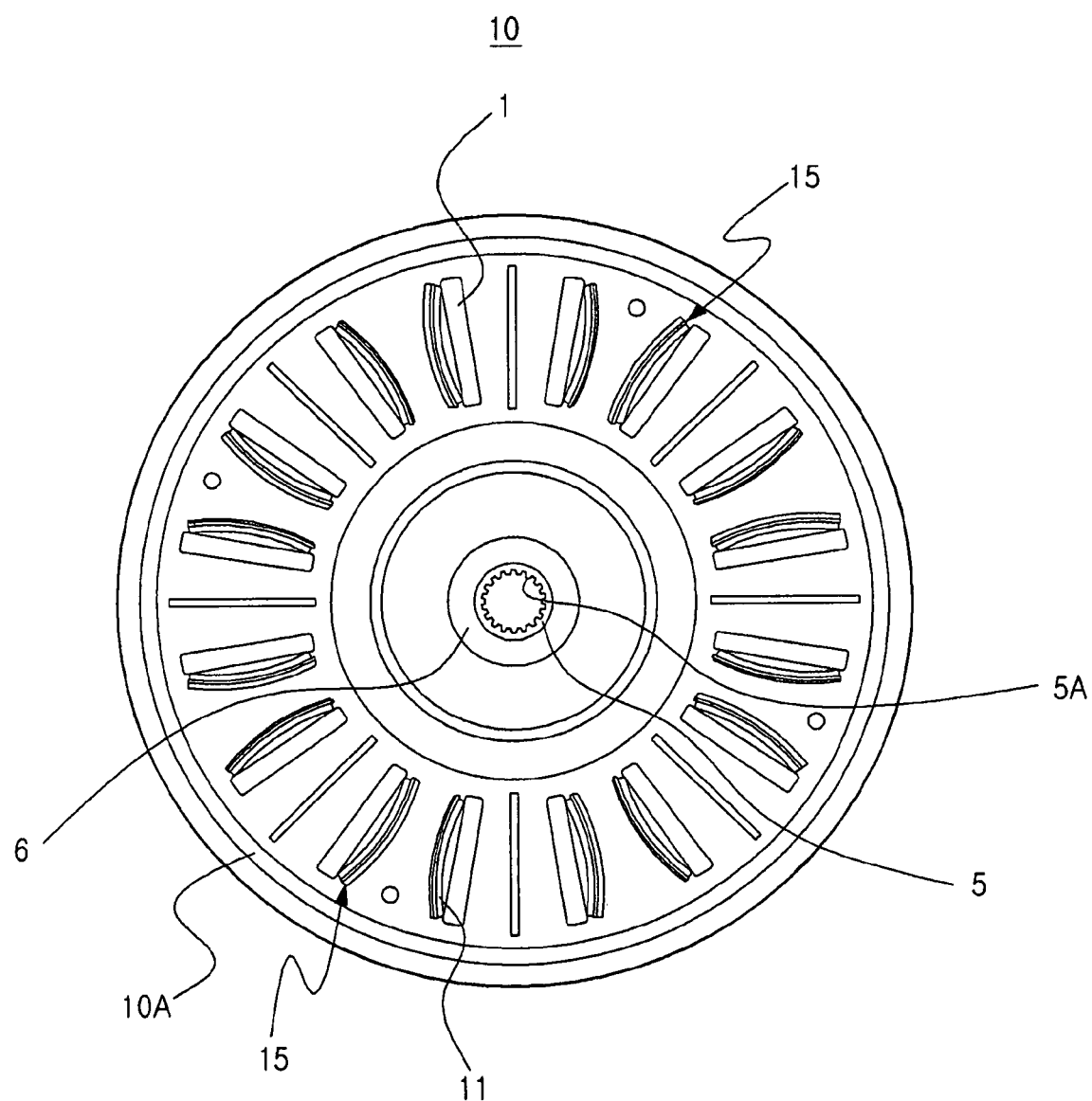
FIG. 5 illustrates a top view of the rotor in accordance with the present invention.

Further, as shown in FIG. 5, the cooling fins 5 are fixed connected to the bottom surface of the rotor 10 so as to be symmetric with the neighboring one. Therefore, the cooling fins 15 can function selectively according to a rotation direction, i.e., a forward direction and a backward direction, of an outer rotor type motor employing the rotor 10 of the present invention, so that the introduction of the outside air into the inside can be performed effectively with regardless to the rotation direction of the outer rotor type motor.

Figure 6:
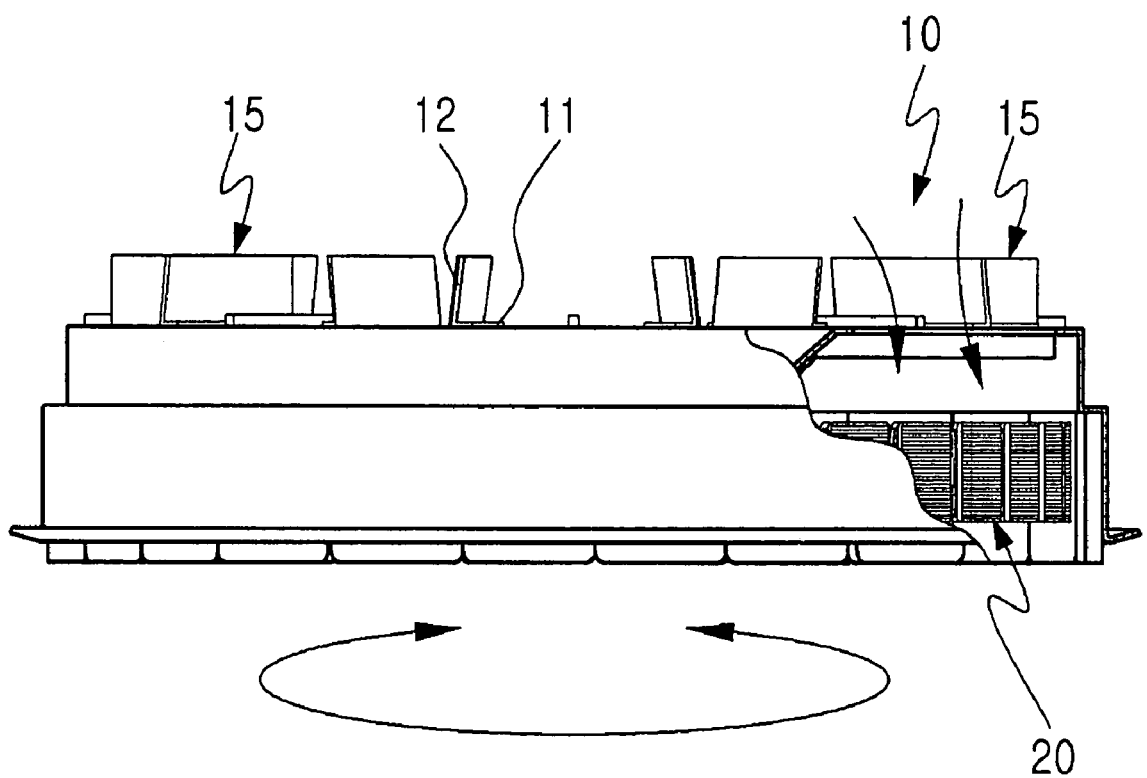
FIG. 6 sets fort an operation view of the rotor in accordance with the present invention.

An operation of the rotor, with the configuration described above, in accordance with the present invention will be described with reference to FIG. 6.

The rotor 10 for use in an outer rotor type motor of a drum type washing machine in accordance with the present invention is coupled to the outside of the stator 20 attached in a rear portion of the drum type washing machine to constitute the outer rotor type motor 50. And rotor 10 is driven to rotate forward and backward the shaft of the drum connected to its shaft coupler 5 according to the operation of the outer rotor type motor 50. So the washing is performed on the laundry articles in the drum by the falling energy.

In accordance with the present invention, heat can be emitted by circulating air through the radiation holes 1 when the rotor 10 is rotated forward and backward according to the operation of the washing machine, and, as well, the contacting area with the air is increased due to the cooling fins 15 attached beside the radiation holes 1. Therefore, even when the drum type washing machine is operated continuously for a long period of time, the cooling effect can be improved, preventing the overheating of the outer rotor type motor 50 of the drum type washing machine.

Further, the cooling fin 15 is provided with the curved member 12 functioning as the impeller. Therefore, the cooling fins 15 can introduce forcedly the outside air into the inside through the radiation holes 1 during the forward and backward rotation of the outer rotor type motor 50, so that the overheating of the outer rotor type motor can be prevented despite its long period operation without stopping. Accordingly, the efficiency degradation of the outer rotor type motor can be prevented and any damage, which may be caused to other parts due to the overheating, can also be prevented.

As described above, the rotor 10 for use in an outer rotor type motor of a drum type washing machine includes the cooling fins 15, each of which is attached near the each of the radiation holes 1 formed continuously in the radial direction, wherein the cooling fin 15 has the curved member 12 whose both surfaces have a shape of a circular arc. Therefore, the contact area with air can be increased and the air circulation through the radiation holes 1 can be improved. Accordingly, the cooling effect of the outer rotor type motor can be improved.

Further, the overheating of the outer rotor type motor can be prevented even when being continuously operated for a long period time. Accordingly, the efficiency degradation of the outer rotor type motor can be prevented and any damage, which may be caused to other parts due to the overheating, can also be prevented.

While the invention has been shown and described with respect to the preferred embodiments, it will be understood by those skilled in the art that various changes and modifications may be made without departing from the spirit and scope of the invention as defined in the following claims.

What is claimed is:

1. A rotor for use in an outer rotor type motor of a drum type washing machine, which is coupled to an outside of a stator, and which is provided with a shaft coupler, for being connected with a shaft of a drum, fixed at its center portion by an injected material, and a plurality of radiation holes formed therein continuously in a radial direction, the rotor comprising:

at least one cooling fin provided with a base member fixed to a bottom surface of the rotor and a curved member attached to the base member, wherein the cooling fin is provided in plurality, and the cooling fins are combined with the bottom surface of the rotor so as to be disposed adjacent to the radiation hole and so as to be symmetric with the neighboring cooling fin.

2. The rotor of claim 1, wherein an angle formed between the curved member and the base member ranges from about 45 to 80°.

3. The rotor of claim 1, wherein a height of the curved member is greater than a width of the radiation hole.

4. The rotor of claim 1, wherein a cross section of the curved member taken along a plane parallel to the base member has a shape of a circular arc.

5. The rotor of claim 1, wherein the cooling fin is combined with the bottom surface of the rotor by means of fastening a bolt.

6. The rotor of claim 1, wherein the cooling fin is combined with the bottom surface of the rotor by means of welding.

* * * * *